United States Patent Office 2,719,842
Patented Oct. 4, 1955

2,719,842

BIS-ANTHRAQUINONYL AMIDES OF AZOBIPHENYLDICARBOXYLIC ACID

Joseph Deinet, Glassboro, N. J., assignor to E. I. du Pont de Nemours and Company, Wilmington, Del., a corporation of Delaware No Drawing. Application July 9, 1951,
Serial No. 235,895

6 Claims. (Cl. 260—207.1)

This invention relates to new compounds which are anthraquinonyl amides of azobiphenyldicarboxylic acid, and specifically to mono- and disulfo derivatives which are valuable as vat dyes and as intermediates for the preparation of other vat dyes. These compounds are mono- and disulfo derivatives of the formula:

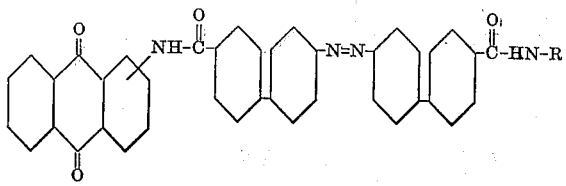

in which R stands for a vattable radical of the group consisting of the unsubstituted anthraquinone radical and the anthraquinone radicals carrying a single monovalent substituent of the group consisting of halogen, methyl, carboxylic acid and benzoylamino groups; the two anthraquinone nuclei being attached to the imino groups in one of the positions alpha and beta, at least one of the anthraquinone nuclei carrying in a beta position a single sulfo group of the formula —SO₃M in which M stands for —H, —Na and —K.

In U. S. Patent 2,228,455 a series of dianthraquinonyl amides containing azobiphenyl group are disclosed which when applied as vat dyes have relatively good fastness properties but which are considerably weaker than the corresponding type of compounds when converted to the azole types, as more particularly disclosed in U. S. Patent 2,175,803. The dianthraquinonyl amide type dyes of U. S. Patent 2,228,455 further suffer from the defect that they are not suitable for application to textile materials by the usual vat printing processes since they require excessive time for aging and therefore result in weak and dull prints.

It is an object of the present invention to produce a class of yellow dyes in the anthraquinone vat dye series which may be applied by the usual vat dyeing and printing processes, and which when applied by these processes produce strong dyeings having good fastness properties. It is a further object of the invention to provide strong, fast vat dyes in the yellow range which are particularly good as printing colors, being readily reduced in the printing gum and which are rapidly and completely fixed on the fiber during the aging process.

I have found that the bisanthraquinonyl amides of the azobiphenyldicarboxylic acid group as formulated above, when they carry one or two sulfonic acid groups either as the free acid or more particularly as the alkali metal salts of such acids, dye and print cellulose materials by the usual vat dyeing and printing processes in strong, fast yellow shades, whereas compounds of similar formulae which do not carry at least one sulfonic acid group are not satisfactory printing colors even when applied from printing pastes containing the usual printing assistants.

The compounds of this invention may be prepared in a non-reactive medium by condensing an aminoanthraquinone or an aminoanthraquinone-beta-sulfonic acid, either of which may carry a substituent of the group consisting of halogen, methyl, —COOH or a benzoylamino group, with 4,4'-azobiphenyl-4''',4'''-dicarboxylic acid chloride in substantially molar ratios, and then further condensing the resulting mono acid chloride in situ with an aminoanthraquinone-beta-sulfonic acid or a halogen aminoanthraquinone-beta-sulfonic acid at temperatures in the range of from 100° to 210° C. The products may be conditioned for dyeing or printing in the usual manner, such as by milling or acid pasting with or without purification with sodium hypochlorite. These new products are generally yellow pastes; they dye and print cotton or related fibers in bright shades. Their wet-fastness is of the same high order as found in most anthraquinone vat colors. Other fastness properties are in no way impaired by the presence of the sulfo groups.

The following examples are given to illustrate the invention. The parts used are by weight.

Example 1

580 parts of nitrobenzene, 2 parts of pyridine, 35.5 parts of 2-aminoanthraquinone-3-sulfonic acid sodium salt (fine powder) and 50 parts of 4,4'-azobiphenyl-4''',4'''-dicarboxylic acid chloride are heated together, while agitating, at from 168° to 170° C. and maintained at this temperature for three hours. After cooling to 100° C. there are added 24.3 parts of 1-aminoanthraquinone. The reaction mass is then heated to 205° C. and maintained for three hours. It is then cooled to 25° C., filtered, the filter cake washed with nitrobenzene and alcohol in turn, and dried. The product is then acid pasted by drowning in water a concentrated sulfuric acid solution of the color, thereafter filtered, washed acid-free and purified by bleaching with sodium hypochlorite. It forms a bright yellow paste and dyes and prints cotton or related fiber in bright yellow shades of good fastness properties. The final product in the form of the sodium salt has the formula:

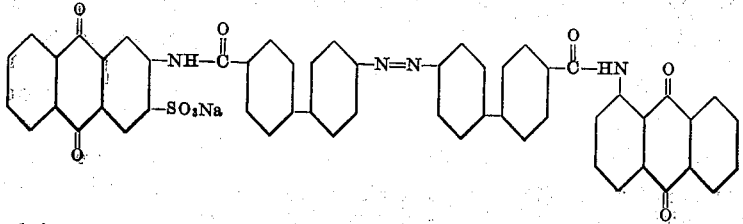

Example 2

Ten hundred (1000) parts of nitrobenzene, 2 parts of pyridine, 55 parts of 4,4'-azobiphenyl-4''',4'''-dicarboxylic acid and 43 parts of thionyl chloride are heated together to from 98° to 100° C. and maintained at this temperature for twenty hours. The mass is then air blown for one hour to remove excess of thionyl chloride. After cooling to 80° C., there are added 37.3 parts of 2-aminoanthraquinone-3-sulfonic acid sodium salt (fine powder) and the reaction mass is then heated to 170° C. and maintained at this temperature for three hours. The mass is then cooled to 25° C. and, after 25.6 parts of 2-aminoanthraquinone are added, it is heated to 208° C. and maintained for three hours. It is then cooled to 50° C., filtered and the filter cake washed with nitrobenzene and alcohol, in turn, and dried. The product is then acid pasted and purified as in Example 1. It forms a bright yellow paste and dyes and prints cotton in bright yellow shades of good fastness properties. The product in the form of the sodium salt has the formula:

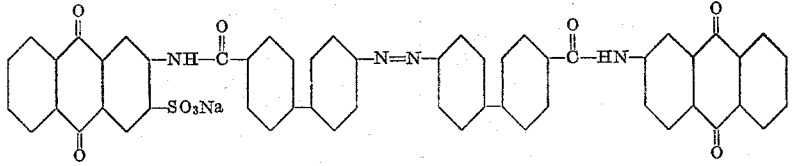

Example 3

Ten hundred (1000) parts of nitrobenzene, 2 parts of pyridine, 55 parts of 4,4'-azobiphenyl-4'',4'''-dicarboxylic acid sodium salt and 43 parts of thionyl chloride are heated together while agitating to 100° C. and maintained at this temperature for twenty hours. The mass is then air blown for one hour to remove excess of thionyl chloride. The mass is then cooled to 50° C. and 38.5 parts of 2-aminoanthraquinone-3-sulfonic acid sodium salt fine powder are added, the reaction mass is then heated to 170° C. and maintained at this temperature for three and one-half hours. It is then cooled to 50° C. and 40.7 parts of a normally occurring mixture of 1-amino-5(and 8)-benzoylaminoanthraquinones are added. The mass is then heated to 210° C. and maintained at this temperature for one and one-half hours, after which it is cooled to 50° C., filtered and the filter cake washed with nitrobenzene and alcohol in turn, and dried. The product is then acid pasted and purified as in Example 1. It forms a bright yellow paste and dyes and prints cotton or related fibers in bright yellow shades of good fastness properties and strength. The product in the form of the sodium salt has the formula:

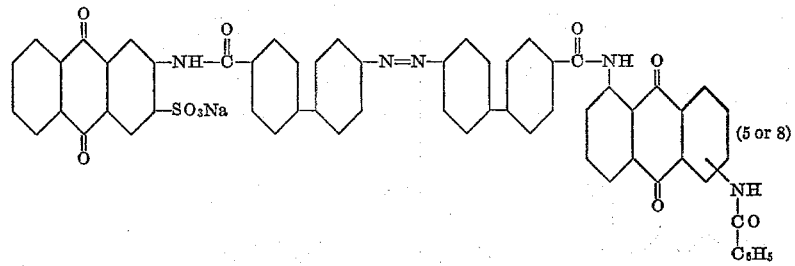

Example 4

Eleven hundred (1100) parts of nitrobenzene, 2 parts of pyridine, 43 parts of 4,4'-azobiphenyl-4'',4'''-dicarboxylic acid and 40 parts of thionyl chloride are heated together to 100° C. and maintained for fifteen hours. The mass is then air blown for one hour to remove excess of thionyl chloride and cooled to 25° C., then 26 parts of 1-amino-6-chloroanthraquinone are added and it is heated to 140° C. and maintained at this temperature for three hours. The mass is then cooled to 25° C. and 32.5 parts of 2-aminoanthraquinone-3-sulfonic acid (Na salt) fine powder are added and the temperature raised to 208° C. and maintained at this temperature for one and one-half hours. The mass is then cooled to 50° C., filtered and the filter cake washed with nitrobenzene and alcohol in turn, and dried. The product is then acid pasted and purified as in Example 1. It forms a bright yellow paste and dyes and prints cotton in bright yellow shades of good fastness properties. The product in the form of the sodium salt has the formula:

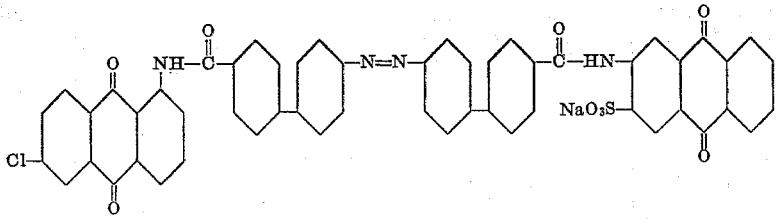

Example 5

Ten hundred (1000) parts of nitrobenzene, 2 parts of pyridine, 43 parts of 4,4'-azobiphenyl-4'',4'''-dicarboxylic acid and 40 parts of thionyl chloride are heated together to 100° C. and maintained for fifteen hours. Then the mass was air blown for one hour, cooled to 25° C., and after 27 parts of 1-aminoanthraquinone-6(7)-carboxylic acid (fine powder) are added, it is heated to from 160° to 165° C. and maintained for six hours at that temperature. The mass is then cooled to 25° C. and 32.5 parts of 2-aminoanthraquinone-3-sulfonic acid sodium salt (fine powder) are added and then the temperature raised to 208° C. and maintained at this temperature for one and one-half hours. The mass is then cooled to 40° C., filtered and the filter cake washed with nitrobenzene and alcohol in turn, and dried. The product is then acid pasted and purified as in Example 1. It forms a bright yellow paste and dyes and prints cotton in bright yellow shades of good fastness properties. The product in the form of the sodium salt has the formula:

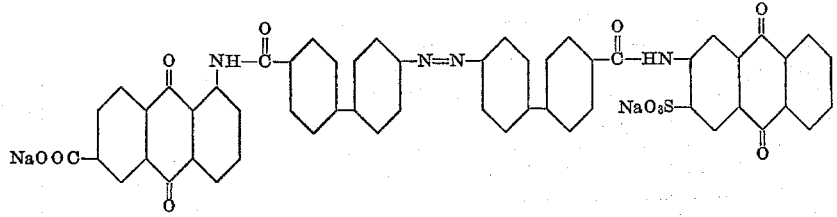

Example 6

Ten hundred (1000) parts of nitrobenzene, 2 parts of pyridine, 43 parts of 4,4'-azobiphenyl-4'',4'''-dicarboxylic acid and 40 parts of thionyl chloride are heated to 100° C. and maintained for fifteen hours. The mass is then cooled to 25° C. and 23 parts of 1-aminoanthraquinone are added. The temperature is raised to from 130° to 132° C. and maintained at this temperature for three hours. The mass is then cooled to 25° C., when 34 parts of 1-aminoanthraquinone-6(7)-sulfonic acid potassium salt (fine powder) are added. The mass is then heated to 200° C. and maintained at this temperature for one and one-half hours. It is then cooled to 70° C., filtered and the cake washed with nitrobenzene and alcohol in turn, and dried. The product is then acid pasted and purified as in Example 1. It forms a bright yellow paste and dyes and prints in bright yellow shades of good fastness properties. The product in the form of the sodium salt has the formula:

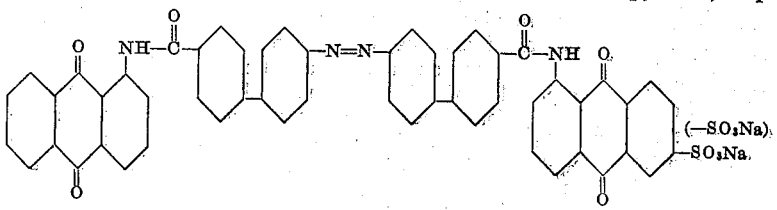

Example 7

Ten hundred (1000) parts of nitrobenzene, 2 parts of pyridine, 43 parts of 4,4'-azobiphenyl-4'',4'''-dicarboxylic acid and 40 parts of thionyl chloride are heated together to 100° C. and maintained for fifteen hours. The mass is then cooled to 25° C. and 26 parts of 1-chloro-2-aminoanthraquinone are added. It is then heated to 138° to 140° C. and maintained at this temperature for six hours, then cooled to 25° C. and 32.5 parts of 2-aminoanthraquinone-3-sulfonic acid sodium salt (fine powder) are added. The mass is then heated to 205° C. and maintained at this temperature for one and one-half hours, then cooled to 50° C., filtered and the filter cake washed with nitrobenzene and alcohol in turn, and dried. The product is then acid pasted and purified as in Example 1. It forms a bright yellow paste and dyes and prints in bright yellow shades of good fastness properties. The product in the form of the sodium salt has the formula:

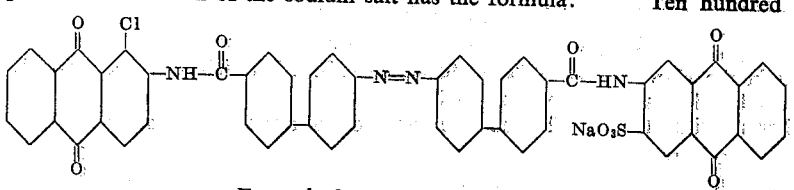

Example 8

Ten hundred (1000) parts of nitrobenzene, 2 parts of pyridine, 43 parts of 4,4'-azobiphenyl-4'',4'''-dicarboxylic acid and 40 parts of thionyl chloride are heated together to 100° C. and maintained at this temperature for fifteen hours. The mass is then cooled to 25° C. and after 26 parts of 1-chloro-2-aminoanthraquinone are added, it is heated to 140° C. and maintained at this temperature for six hours. The mass is then cooled to 50° C. and 34.1 parts of 1-aminoanthraquinone-6-sulfonic acid potassium salt (fine powder) are added and then heated to 202° C. and maintained at this temperature for one and one-half hours. It is then cooled to 50° C., filtered, and the filter cake washed with nitrobenzene and alcohol in turn, and dried. The product is then acid pasted and purified as in Example 1. It dyes and prints in bright yellow shades of good fastness properties and in the form of the sodium salt has the formula:

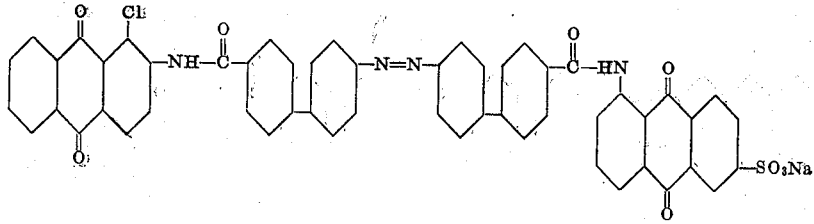

Example 9

Ten hundred (1000) parts of nitrobenzene, 2 parts of pyridine, 43 parts of 4,4'-azobiphenyl-4'',4'''-dicarboxylic acid and 40 parts of thionyl chloride are heated together to 100° C. and maintained for one hour, then the mass is air blown for one-half hour to remove excess of thionyl chloride. The mass is then cooled to 50° C. and after 22.3 parts of 1-aminoanthraquinone are added, it is heated to 130° C. and maintained at this temperature for three hours. The mass is then cooled to 25° C. and after 36 parts of 1-chloro-2-aminothraquinone-3-sulfonic acid sodium salt (fine powder) are added, the mass is heated to 205° C. and maintained at this temperature for one and one-half hours. It is then cooled to 50° C., filtered, the filter cake washed with nitrobenzene and alcohol in turn, and dried. The product is then acid pasted and purified as in Example 1. It dyes and prints cotton in bright yellow shades of good fastness properties and in the form of the sodium salt has the formula:

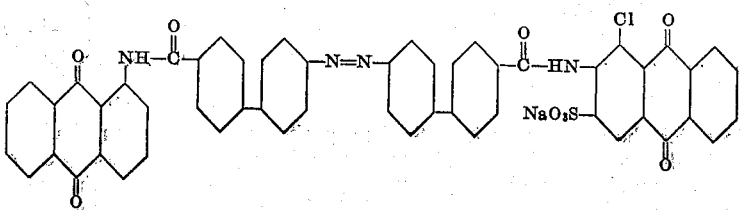

Example 10

Ten hundred (1000) parts of nitrobenzene, 2 parts of pyridine, 43 parts of 4,4'-azobiphenyl-4'',4'''-dicarboxylic acid and 40 parts of thionyl chloride are heated together to 100° C. and maintained for fifteen hours. The mass is then air blown for one hour to remove excess of thionyl chloride. The mass is then cooled to 50°

C. and 32.5 parts of 2-aminoanthraquinone-3-sulfonic acid sodium salt (fine powder) are added. It is then heated to from 170° to 175° C. and maintained for three hours. After cooling to 50° C., there are added 32.5 parts of a normally occurring mixture of 1-aminoanthraquinone-6(7)-sulfonic acid sodium salt (fine powder) and the mass is then heated to 205° C. and maintained at this temperature for two hours. It is then cooled to 50° C., filtered and the filter cake washed with nitrobenzene and alcohol in turn, and dried. It is then acid pasted and purified as in Example 1. It forms a bright yellow paste and dyes and prints in bright yellow shades of good fastness properties. In the form of the sodium salt it has the formula:

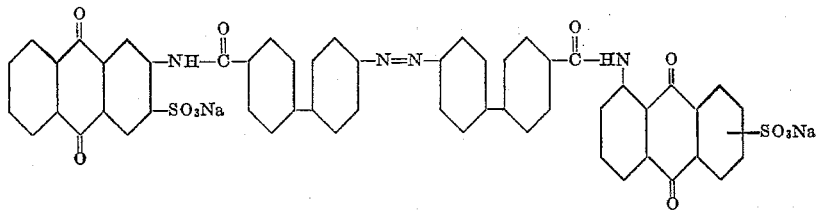

in which the sulfo group is in the beta position.

*Example 11*

Ten hundred (1000) parts of nitrobenzene, 2 parts of pyridine, 43 parts of 4,4'-azobiphenyl-4'',4'''-dicarboxylic acid and 40 parts of thionyl chloride are heated together to 100° C. and maintained for fifteen hours. The mass is then air blown for one hour to remove excess of thionyl chloride. It is cooled to 50° C. and 24 parts of 1-amino-2-methylanthraquinone are added and then heated to 130° C. and maintained at this temperature for four hours. After cooling to 50° C. and adding 36 parts of a normally occurring mixture of 1-aminoanthraquinone-6(7)-sulfonic acid sodium salt (fine powder), the mass is then heated to 205° C. and maintained at this temperature for one and one-half hours. It is then cooled to 50° C., filtered and the filter cake washed with nitrobenzene, alcohol and hot water in turn, and dried. The product is then acid pasted and purified as in Example 1. It forms a bright yellow paste and dyes and prints in yellow shades of good fastness properties, and in the form of the sodium salt it has the formula:

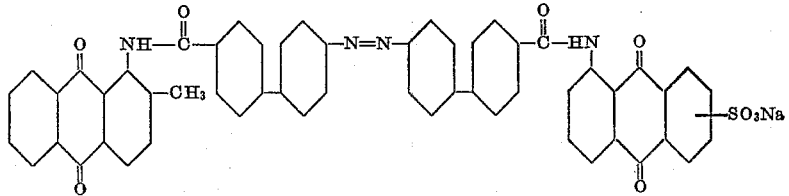

in which the sulfo group is in the beta positions.

As illustrated in the above examples, at least one of the anthraquinone nuclei may carry any of the substituents usually introduced into the anthraquinone nucleus in the preparation of anthraquinone vat dyes, such as halogen, methyl groups, benzoylamino groups and the carboxylic acid radical, the latter being illustrated more particularly in my U. S. Patent 2,601,100 of June 17, 1952. It will be obvious that, in place of the particular aminoanthraquinones which are employed in the above examples, isomeric compounds may be employed, that is, where the sulfonic acid group or the other substituents are in various positions on the molecule, with the exception that the compounds of this invention must carry the sulfonic acid group in a beta position on the anthraquinone nucleus. 1-Amino-5-chloroanthraquinone, 1-amino-8-chloroanthraquinone, 1-amino-4-chloroanthraquinone may obviously be substituted for the 1-amino-6-chloroanthraquinone in Example 4. In the same manner, in Example 5, 1-aminoanthraquinone-5-carboxylic acid (or the 8 isomer) may be substituted for the 1-aminoanthraquinone-6-carboxylic acid specifically disclosed. So, also, 1,3-dichloro-2-aminoanthraquinone, 1,3-dibromo-2-aminoanthraquinone or 1-bromo-2-amino-3-anthraquinone sulfonic acid and similar compounds may be substituted for those specifically used in the condensation reactions of the above examples. The methylthioanthraquinoneamines such as 1-methylthio-2-aminoanthraquinone or the 1-amino-4(5 or 6)-methylthioanthraquinones may likewise be used.

Since the dominating characteristic of the dyes of the molecules of this invention is the presence of at least one sulfonic acid group in a beta position on the anthraquinone nuclei of the bis-anthraquinonylamides of azobiphenyldicarboxylic acid, it will be obvious that the simple monovalent substituents present on the same or on the other anthraquinone nucleus do not change the character of the resulting dyes.

I claim:

1. The anthraquinone vat dyes having the general formula:

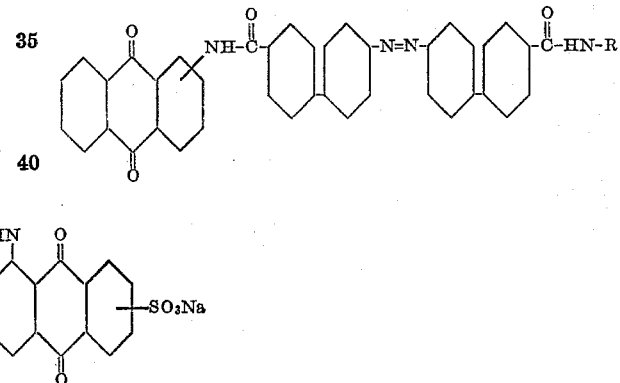

in which R stands for a vattable radical of the group consisting of the unsubstituted anthraquinone radical and the anthraquinone radicals carrying a single monovalent substituent of the group consisting of halogen, methyl, carboxylic acid and benzoylamino groups; the two anthraquinone nuclei being attached to the imino groups in one of the positions alpha and beta, at least one of the anthraquinone nuclei carrying in a beta position a single sulfo group of the formula —$SO_3M$ in which M stands for —H, —Na and —K.

2. The anthraquinone vat dye of the formula:

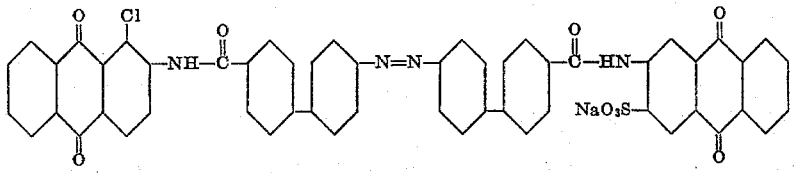

3. The anthraquinone vat dye of the formula:

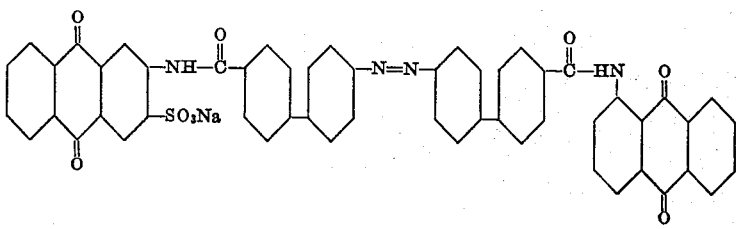

4. The anthraquinone vat dye of the formula:

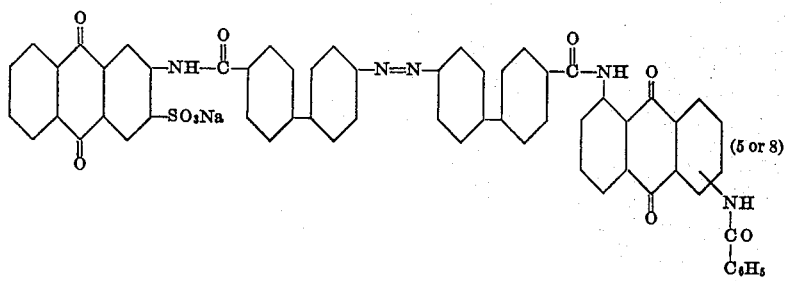

5. The anthraquinone vat dye of the formula:

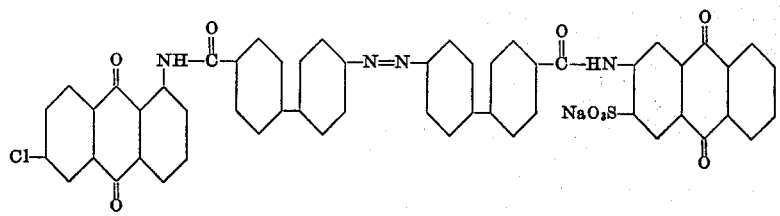

6. The anthraquinone vat dye of the formula:

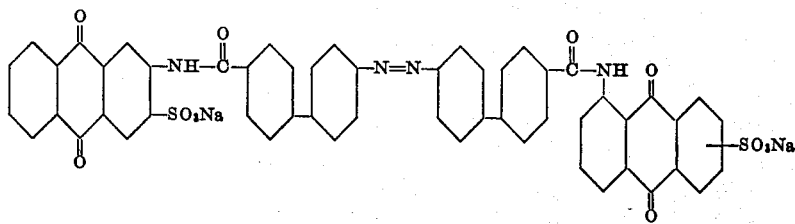

in which the second sulfo group is in the beta position.

References Cited in the file of this patent

UNITED STATES PATENTS

| | | |
|---|---|---|
| 2,108,126 | Honold et al. | Feb. 15, 1938 |
| 2,145,954 | Semple et al. | Feb. 7, 1939 |
| 2,228,455 | Honold et al. | Jan. 14, 1941 |
| 2,395,229 | Lowe et al. | Feb. 19, 1946 |
| 2,601,100 | Deinet | June 17, 1952 |

OTHER REFERENCES

Georgievics et al., "Dye Chemistry," 1920, pages 6 and 7.